United States Patent [19]

Satzinger

[11] 3,983,959

[45] Oct. 5, 1976

[54] GALVANIC GAS-GENERATING ELEMENT FOR A LUBRICATOR AUTOMATICALLY DELIVERING LUBRICANT

[75] Inventor: Roland Satzinger, Euerdorf, Germany

[73] Assignee: Gebhard Satzinger Metallwarenfabrik, Bad Kissingen, Germany

[22] Filed: June 30, 1975

[21] Appl. No.: 591,790

[30] Foreign Application Priority Data

July 1, 1974 Germany............................ 2431552

[52] U.S. Cl............................ 184/39; 204/DIG. 6
[51] Int. Cl.²........................................ F16N 11/10
[58] Field of Search ............... 184/39, 14; 204/248, 204/150, DIG. 6, 280; 222/386, 389

[56] References Cited

UNITED STATES PATENTS

| | | | |
|---|---|---|---|
| 2,557,989 | 6/1951 | McIntosh | 204/248 |
| 2,791,556 | 5/1957 | Pigeon | 204/248 |
| 3,301,777 | 1/1967 | Leonard | 204/280 X |
| 3,303,118 | 2/1967 | Anderson | 204/280 X |
| 3,430,731 | 3/1969 | Satzinger | 184/39 |
| 3,527,685 | 9/1970 | Anderson | 204/280 X |
| 3,691,870 | 8/1972 | Wolf | 204/DIG. 6 X |
| 3,842,939 | 10/1974 | Satzinger | 184/39 |
| 3,882,011 | 5/1975 | Hines et al. | 204/280 X |
| D137,235 | 2/1944 | Butler | 204/248 X |

Primary Examiner—Richard C. Pinkham
Assistant Examiner—Arnold W. Kramer
Attorney, Agent, or Firm—Burgess, Dinklage & Sprung

[57] ABSTRACT

An improvement in a grease box comprising a casing having a closed expandable hollow body, the hollow body containing an electrolytic fluid into which a galvanic element is advanceable to produce gas under pressure to effect expansion of the hollow body which, in turn, effects dispensation of a lubricant out of a chamber into the grease box, the improvement lying in the galvanic element which comprises a galvanically positive member and a galvanically negative member currently conductingly connected to one another has at least one of the members covered by a non-electrolytic non-electrolyte soluble covering material, both the positive and negative members having at least one surface uncovered and in contact with electrolyte when the galvanic element is advanced into the electrolytic fluid.

15 Claims, 5 Drawing Figures

GALVANIC GAS-GENERATING ELEMENT FOR A LUBRICATOR AUTOMATICALLY DELIVERING LUBRICANT

BACKGROUND OF THE INVENTION

1. Field of the Invention

This invention relates to grease boxes comprising a galvanic gas-generating element for delivering automatically a lubricant. More particularly this invention relates to an improved galvanic element in a grease box containing a galvanic gas-generating element which automatically delivers lubricant over a long period of time to a lubricating location.

2. Discussion of the Prior Art

Lubricators which automatically deliver lubricants have been known. Such are described in German Pat. No. 1,256,001, U.S. Pat. No. 3,430,731 and U.S. Pat. No. 3,842,939, the disclosures of which are hereby incorporated herein by reference. In the lubricator of U.S. Pat. No. 3,430,731, for example, there is provided a device which is brought into operation at a desired instant by the generation of gas in a tightly closed hollow extensible body. Within the extensible body pressure develops which causes the walls of the extensible body to increasingly bear against a lubricant maintained in a lubricant chamber. The lubricant is, in turn, caused to flow through a lubricant channel from the lubricator on to a lubricating location. By the use of such a device gas can develop in the hollow extensible body over a period of time. This, in turn, causes the lubricant to be dispensed to the lubricating location over the same period of time. The device is useful in the lubrication of various bearing surfaces and the like over a long period of time on the order of months.

Unfortunately, it has been found that the amount of lubricant which is dispensed to the bearing surface oftentimes varies. It is thought that the gas which is generated in the galvanic element may be generated at an inconstant value. The gas is usually generated by disposing the galvanic element which comprises a positive electrode current conductingly connected to the negative electrode into the electrolyte by engagement of a screw from a space closed off from the extensible body. Since during the generation of gas the negative electrode's surface is altered the relationship of the positive electrode's surface to the negative electrode's surface changes. When this change occurs it is theorized that the amount of gas which is generated varies which, in turn, effects the amount of pressure generated in the hollow extensible body. Since the pressure varies over the period of time the amount of lubricant which is dispensed to the lubricating locating correspondingly varies. It has therefore become desirable to provide an improved galvanic gas generating element wherein the effective surface of the positive and negative electrodes are maintained constant so as to generate constantly the same amount of gas at the same pressure and to cause the same amount of lubricant to be dispensed over the period of time. It has further become desirable to provide such a gas generating galvanic element which will dispense an exact constant amount of lubricant over several months.

SUMMARY OF THE INVENTION

The objects of the invention are provided in a grease box comprising a casing having a closed expandable hollow body, said hollow body containing an electrolytic fluid into which a galvanic element is advanceable to produce gas under pressure to effect expansion of said hollow body which, in turn, effects dispensation of a lubricant out of a chamber in said grease box, the improvement lying in that said galvanic element comprises a galvanically positive member and a galvanically negative member current conductingly connected to one another, at least one of said members having at least two dimensions thereof covered by an electrolytically neutral non-electrolyte soluble covering material, both of said members having at least one surface uncovered and in contact with electrolyte when said galvanic element is advanced into said electrolytic fluid.

It has been found that if the active surfaces of the positive electrode and negative electrode can be maintained constant that gas will be generated at a constant value whereby to insure that the lubricant is dispensed to the lubricating location at a constant rate over a period of time. This is performed according to the invention by covering a major dimension of at least one of the electrode materials to insure that the surface which is ultimately in contact with the electrolyte is the only surface which is subjected to the electrolytic action. This insures that only that surface which is uncovered in the case of the negative electrode, can undergo dissolution into the electrolyte fluid. The coating material prevents the other surfaces from being wetted by the electrolyte fluid. On the free surfaces are wetted whereby a constant gas development results.

The positive electrode can be enveloped which is expedient particularly when the positive electrode is arranged as usual in the negative dissolving metal. Conversely, the negative electrode that is formed of the negative metal can also be enveloped by covering material. In some instances the galvanic element can comprise an alloy of positive and negative material in intimate a contact with one another so that visually there are no distinct electrodes. In such an instance it is preferred to preform the electrode into a rod or similar shape and to envelop one dimension thereof such as the length. This leaves exposed at least the base or the top of the element. This insures that it is only that negative metal at the base or top of the rod shaped electrode which partakes in the galvanic reaction. More will be said about this below.

BRIEF DESCRIPTION OF DRAWINGS

Referring to the drawings herein.

DESCRIPTION OF SPECIFIC EMBODIMENTS

Figure 1:
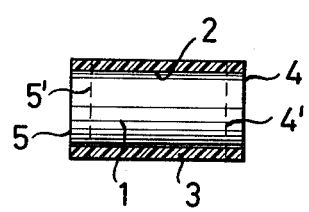
FIG. 1 is a side cross-sectional elevation of a galvanic element for use in a grease box according to one embodiment of the invention wherein the galvanic element comprises a rod-shaped material itself composed of an alloy of negative and positive metal.

Referring to FIG. 1 there is provided a galvanic element in the form of a core which is composed of an alloy of positive and negative metal, for example, copper and aluminum. In this embodiment there is visually no distinct positive electrode member and negative electrode member. The positive and negative metal are together enveloped by an envelope surface 2 with a coating 3 of electrolytically neutral, non-soluble material, for example, a synthetic material such as a thermoplastic or thermoplastic setting resin. This leaves end faces 4 and 5 for direct contact with the electrolytic fluid when the galvanic element is urged into the electrolytic fluid. Thus it is insured that the electrolytic fluid will not cause any negative material on the major dimension of the element to dissolve into solution whereby to increase the surface contact of the negative material with the electrolytic fluid. Only the end faces 4 and 5 are free and only these surfaces can be wetted and attacked by the electrolyte fluid. On progressive erosion, the same area 4' and 5' (drawn in dashed lines in FIG. 1) respectively, remain. These surfaces have the same dimension an original surfaces 4 and 5. This means that the same quantity of gas is constantly generated over the lifetime of the galvanic element.

Figure 2:
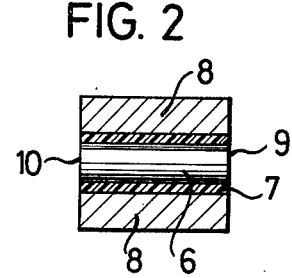
FIG. 2 shows another embodiment of the invention in which a positive electrode is enveloped by a covering material which, in turn, is enveloped by a negative electrode material.

Referring to FIG. 2 there is shown a second embodiment of the invention wherein a negative electrode 8 is arranged around a rod-shaped positive electrode 6 which positive electrode is likewise coated with a coating 7 of electrolytically neutral, non-soluble material. Here again, the maintenance of the constant effective areas 9 and 10 of the positive electrode 6 is assured by the coating 7 when the negative electrode 8 dissolves. The only portion of the galvanic element which partakes of the electrolytic action is at effective areas 9 and 10, galvanic action within the electrode being precluded by the use of the coating material 7.

Figure 3:
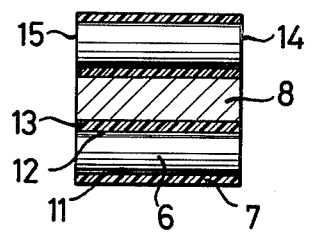
FIG. 3 is another embodiment similar to FIG. 2 except that the negative electrode material forms the center of the galvanic material and is covered by a covering material which, in turn, is enveloped by a positive electrode material, in turn, enveloped by an exterior covering material.

In FIG. 3 there is shown a third embodiment in which the positive electrode 6 is formed in a tubular shape. The negative electrode is in the form of a rod 8 which is enveloped at bore surface 12 by a coating 13. About coating 13 there is disposed the positive electrode material 6 in the form of a tube. Positive electrode 6 is, in turn, enveloped by a further coating 7 which bears against the positive electrode at surface 11. The negative electrode 8 is arranged within the coating 13. The annular end faces 14 and 15 of the positive electrodes 6 are the only surfaces thereof exposed to the electrolyte liquid. Hence, it is only at these surfaces and the ends of the negative electrode 8 that can be worn away by the electrolytic action. This insures the proper surface relationship of the positive electrode to the negative electrode and insures the generation of the constant amount of gas over a long period of time.

Figure 4:
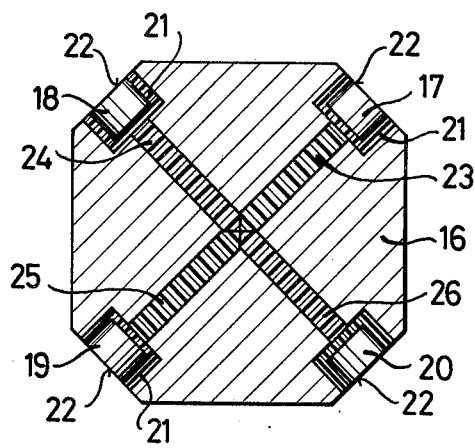
FIG. 4 is a sectional view of IV—IV of FIG. 5 showing the disposition of a plurality of positive electrodes within an insert of a covering material all of which is disposed within a negative electrode in the form of a platelet-shaped element.
Figure 5:
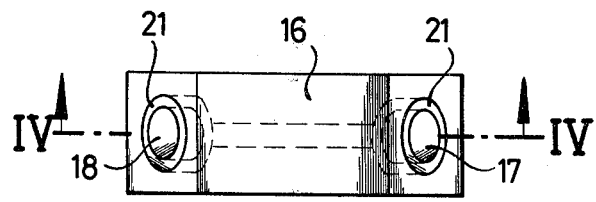
FIG. 5 is a plan view of the galvanic element of FIG. 4.

Referring to FIGS. 4 and 5 there is provided a platelet-shaped element 16 of substantially square cross-section. In this embodiment a plurality of positive electrodes 17, 18, 19 and 20 are disposed within inserts at the four corners of the platelet-shaped element 16. These positive electrodes are provided according to the invention with a coating 21 which acts as an insert so that merely the surface 22 remains free to attack for the electrolyte liquid. The individual positive electrodes are connected among one another by the spoke shaped elements 23, 24, 25 and 26. These spoke-shaped elements can suitably be manufactured from the same electrolytically neutral electrolyte non-soluble material from which the insert members are constructed. In fact they can be made integral therewith. By the use of such construction the positive electrode is prevented from separating on a one-sided erosion of the negative electrode. Such separation is avoided by the arrangement of positive electrodes at the corner of the square platelet. The positive electrodes rest against the wall of the extensible body and are no longer wetted by the electrolyte liquid, thus there cannot be produced a reduction of the gas-generating area which would reduce the quantity of gas generated.

It will be apparent to one of skill in the art that the specific relationship of the negative material to the positive material can have any number of various arrangements. What is important is the use of an electrolytically neutral electrolyte non-soluble material to separate a major dimension of the negative electrode from a major dimension of the positive electrode. Stated differently, the electrodes remain in contact with one another only over accurately defined surfaces or areas, the balance of the areas of contact being precluded by the use of a covering material.

What is claimed is:

1. In a grease box comprising a casing having a closed expandable hollow body, said hollow body containing electrolyte fluid into which a galvanic element is advanceable to produce gas under pressure to effect expansion of said hollow body which, in turn, effects dispensation of a lubricant out of a chamber into said grease box, the improvement wherein said galvanic element comprises a galvanically positive member and a galvanically negative member current conductingly connected with one another, at least one of said members having at least two dimensions thereof covered by an electrolytically neutral non-electrolyte soluble covering material, both of said members having at least one surface uncovered and in contact with electrolyte when said galvanic element is advanced into said electrolytic fluid, the effective uncovered surfaces tending to remain constant so as to generate constantly the same amount of gas at the same pressure over a period of time.

2. A grease box according to claim 1 wherein said positive and negative members are in the form of a single rod-shaped member having a height greater than its base, said rod being covered except at its base or its top by said covering material.

3. A grease box according to claim 2 wherein only the base of said rod is uncovered.

4. A grease box according to claim 2 wherein only the top of said rod is uncovered.

5. A grease box according to claim 2 wherein the top and base of said rod are both uncovered.

6. A grease box according to claim 1 wherein said positive member is in the form of a rod having the length thereof covered by said covering material and said negative member is disposed on said covering material.

7. A grease box according to claim 6 wherein said negative member encircles said covering material.

8. A grease box according to claim 1 wherein said negative member is in the form of a rod having the length thereof covered by said covering material and said positive member is disposed on said covering material.

9. A grease box according to claim 8 wherein said positive member encircles said covering material.

10. A grease box according to claim 9 wherein said positive member is, in turn encircled with an electrolytically neutral electrolyte non-soluble covering material.

11. A grease box according to claim 1 wherein one of said members is in the form of a generally platelet-shaped element said platelet shaped element contains an insert constructed of said covering material and the other of said members is disposed in said insert out of direct contact with said member in the form of a platelet.

12. A grease box according to claim 11 wherein said platelet shaped member is the negative member.

13. A grease box according to claim 11 wherein said platelet-shaped member is the positive member.

14. A grease box according to claim 11 wherein there are a plurality of said inserts connected to one another in said platelet-shaped member by an electrolytically neutral electrolyte non-soluble material and each of said inserts contains an electrode member of opposite potential to the electrode member of platelet shape.

15. A grease box according to claim 14 wherein the platelet-shaped member has the shape of a polygon at the corners of which are positioned said electrodes of opposite potential than said platelet-shaped member, each of said electrodes disposed within its respective insert.

* * * * *